May 20, 1969    J. P. THOREL ET AL    3,445,688
LINEAR MOTION DEVICE
Filed Dec. 22, 1964
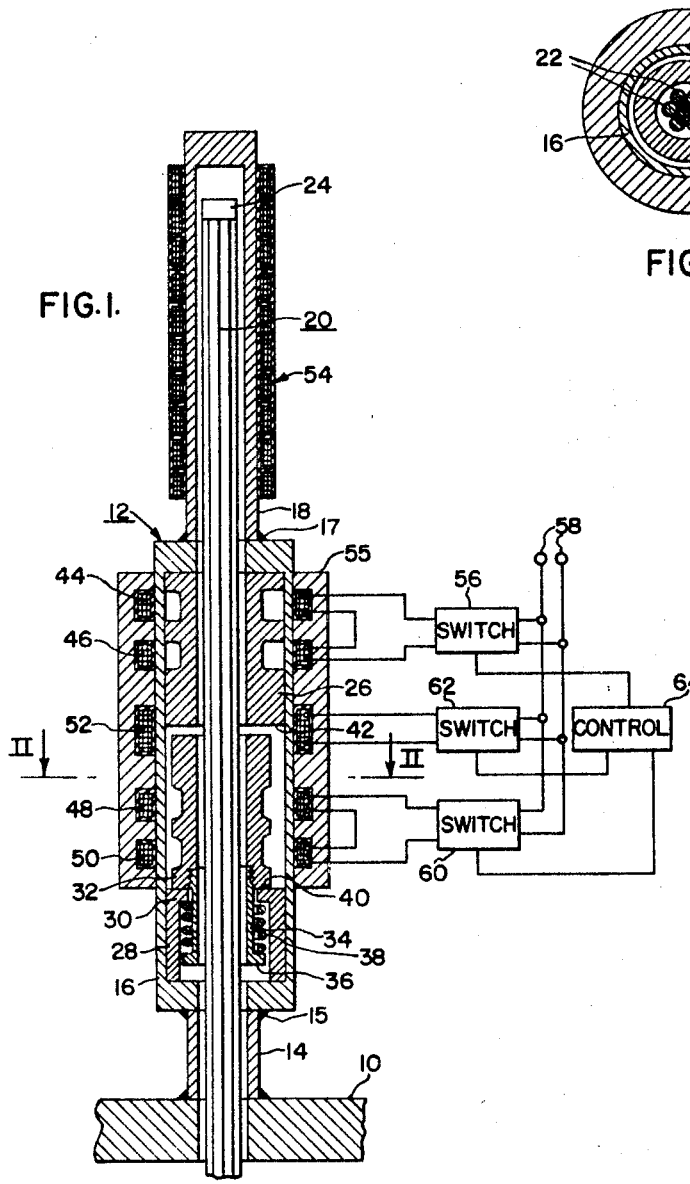
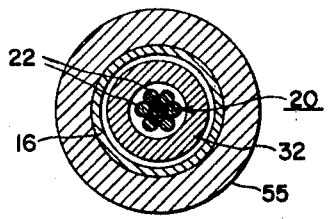
WITNESSES
Theodore F. Wrobel
James T. Young
INVENTORS
John P. Thorel
& Donald G. Sherwood
BY
ATTORNEY

United States Patent Office 3,445,688
Patented May 20, 1969

3,445,688
LINEAR MOTION DEVICE
John P. Thorel, North Ridge, Calif., and Donald G. Sherwood, Pittsburgh, Pa., assignors to Westinghouse Electric Corporation, Pittsburgh, Pa., a corporation of Pennsylvania
Filed Dec. 22, 1964, Ser. No. 420,364
Int. Cl. H02k 41/02
U.S. Cl. 310—14    5 Claims This invention relates to linear motion devices, and more particularly to a friction-type magnetic jack which utilizes a linear element comprising a bundle of rods of magnetically permeable material which can be expanded radially outwardly under the influence of a magnetic field to frictionally grip a stationary or movable member.

Although not limited thereto, the present invention is particularly adapted for use in atomic reactors and the like wherein a number of control rods are moved within the reactor vessel by linear motion devices in order to control the chain reaction developed in the core of the reactor. Such linear motion devices also have utility in actuating various elements and mechanisms along a straight-line path; and it should, therefore, be understood that the specific reference hereinafter made to atomic reactors is for purposes of illustration only and that the invention has other and different applications.

In the past, linear motion devices have been proposed in which a plurality of electromagnetic coils are mounted in a manner to secure by magnetic attraction a linear element passing through the coils. Some of the coils are utilized in combination with mechanical gripping devices to secure the element to a fixed member, while other coils are employed to secure the element to a movable member. The movable member, in turn, is moved in either direction of a straight-line path of travel by a pair of additional or displacement coils.

Two general types of linear motion devices have heretofore been employed. The first of these utilizes a grooved rod or linear element with magnetically actuated latches which positively grip the rod while it advances through successive indexing steps. The second or friction grip type of linear motion device, on the other hand, relies on magnetic expansion of a flexible rod bundle against the bore of a movable plunger.

The present invention is concerned with the second type of linear motion device described above. In the past mechanisms of this type usually required four coils or coil groups for their operation. One coil is utilized to engage the rod bundle with a movable gripper or linear actuating device; another is employed to engage the rod bundle with a stationary gripper member; while the third and fourth coils are utilized as "lift" and "pull-down" coils, respectively, for the purpose of moving the actuating device upwardly or downwardly, as the case may be. The rod bundle is indexed through successive steps by energizing the coils in timed sequence such that the bundle is secured to the movable gripper and moved by one of the actuating coils through an increment of travel, followed by release of the bundle from the movable gripper and engagement with the stationary gripper while the movable gripper is retracted to its starting position by the other actuating coil preparatory to a succeeding indexing cycle.

As one object, the present invention provides a new and improved friction grip magnetic jack which is simpler and less costly in construction than devices of this type heretofore known, and which enables installation of the jack in areas having limited available space.

More specifically, an object of the invention is to provide a linear motion device of the type employing a rod bundle and a friction grip linear actuating device for the rod bundle wherein resilient means are utilized to move the actuating device in one direction; while electromagnetic coil means are utilized to move it in the other direction.

The above and other objects and features of the invention will become apparent from the following detailed description taken in connection with the accompanying drawings which form a part of this specification, and in which:

FIGURE 1 is a cross-sectional elevational view of the linear motion device of the invention; and
FIG. 2 is a cross-sectional view taken substantially along line II—II of FIG. 1.

Referring now to the drawings, and particularly to FIG. 1, the linear motion device shown is particularly adapted for use in an atomic reactor, the top of which is generally indicated at 10. Protecting upwardly from the top 10 is a cylindrical cavity 12 having a lower reduced diameter non-magnetic portion 14 communicating with an intermediate magnetically permeable portion 16 and secured thereto by an annular weld 15. Above the portion 16 is a communicating non-magnetic portion 18 of smaller diameter substantially equal to that of portion 14 and secured to portion 16 by an annular weld 17. Passing through the cylindrical cavity 12 is a linear element 20 which, as best shown in FIG. 2, comprises a bundle of parallel rods 22 secured at their upper ends by means of a cap, generally indicated at 24 in FIG. 1.

Carried within the upper end of the intermediate cylindrical portion 16 is a stationary gripping member 26 of magnetically permeable material. As shown, the member 26 is cylindrical in configuration and surrounds the linear element 20. At the lower end of the cylindrical portion 16 is a stationary cylindrical stop member 28 having, at its upper end, a radially-inwardly extending flange 30.

Between the stop member 28 and stationary gripping member 26 is a cylindrical linear actuating device 32 also of magnetically permeable material. Secured to the lower end of the cylindrical actuating device 32 adjacent element 20 is an annular extension 34 having a radially-outwardly extending flange 36 at its lower end. Between the flange 30 and flange 36 is a coil compression spring 38 which, as shown, serves to push the cylindrical actuating device 32 downwardly and into engagement with a first abutment 40 formed at the top of the stop member 28. Upward movement of the actuating device 32 against the force of the coil spring 38 will force it into engagement with a second abutment or stop 42 on the underside of the stationary gripping member 26.

Surrounding the gripping member 26 are stationary gripper coils 44 and 46. As will be understood, these coils may be energized to create magnetic lines of flux which flow through the member 26 and into the rods 22 of element 20, thereby expanding the rods radially outwardly into frictional engagement with the stationary member 26.

In a somewhat similar manner, gripper coils 48 and 50 surround the linear actuating device 32. These coils are used to produce lines of flux which pass through the magnetically permeable actuating device 32 to expand the rods 22 radially outwardly and into frictional engagement with the inner periphery of the device 32. Finally, an electromagnetic lift coil 52 surrounds the gap ordinarily formed between the top of the actuating device 32 and the abutment 42 on the lower end of member 26. When energized, the coil 52 will produce lines of flux which pull the actuating device 32 upwardly against the force of the coil spring 38. Surrounding the portion 18 is an indicating coil assembly 54 which may be used, in combination with external circuitry, not shown, to indicate the vertical position of the linear element 20. Surrounding each of the coils 44, 46, 48, 50 and 52 is an annular sleeve 55 of magnetically permeable material which provides a low reluctance path for the lines of flux produced by the coils.

The stationary gripper coils 44 and 46 may be connected in series as shown to a switch 56 which, when closed, will connect coils 44 and 46 to a rectified source of alternating current voltage applied to terminals 58. In a similar manner, the movable gripper coils 48 and 50 may be connected in series to a switch 60 which, when closed, will connect them to terminals 58. Finally, the lift coil 52 is also adapted to be connected through switch 62 to input terminals 58. In the particular embodiment of the invention shown herein, which is purely schematic, each of the switches 56, 60 and 62 is controlled by a control circuit, schematically illustrated at 64 in FIG. 1. This control circuit may, for example, comprise a rotating cam shaft controlling mechanical cam switches which, in turn, actuate the switches 56, 60 and 62. However, the control circuit 64 may also take other forms as will be readily apparent to those skilled in the art.

The control circuit 64 is utilized to move the linear element 20 upwardly or downwardly in incremental steps as follows:

To raise the element 20, the control circuit opens and closes switches 56, 60 and 62 in the following cycle, it being assumed initially that the switch 56 is closed to energize coils 44 and 46 whereby the element is held stationary and in frictional engagement with the gripping member 26. The cycle starts by closure of switch 60 to energize coils 48 and 50 whereby the rods 22 will be expanded radially outwardly into frictional engagement with the inner periphery of the actuating device 32. Immediately thereafter, the switch 56 is opened to deenergize the stationary gripping coils 44 and 46. After the coils 44 and 46 are deenergized, switch 62 is closed to energize the lift coil 52, whereupon the magnetic lines of flux of coil 52 pull the actuating device 32, and the rods 22 in frictional engagement therewith, upwardly until the upper end of the actuating device engages the abutment 42. At this point, the switch 56 is again closed to energize coils 44 and 46; and switches 60 and 62 are opened, whereupon the coil spring 38 returns the actuating device 32 to its lowermost position where it is in engagement with the abutment 40.

To lower he linear element 20, switch 56 is again initially closed to energize the coils 44 and 46 whereby the element is held in a stationary position. To initiate the lowering cycle, switch 62 is closed while switch 56 remains closed with the result that the actuating device 32 moves upwardly into engagement with the abutment 42. Thereafter, switch 60 is closed to energize the movable gripper coils 48 and 50 while switch 56 is opened to deenergize the stationary gripper coils 44 and 46. At the same time, or shortly thereafter, switch 62 is opened to deenergize the coil 52, whereupon the force of coil spring 38, in combination with gravity, lowers the actuating device 32 and linear element 20 one step length. To complete the lowering cycle, switch 56 is again closed to energize the stationary gripper coils 44 and 46 while switch 60 is opened to deenergize the movable gripper coils 48 and 50.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a linear motion device, the combination of a linear element, a cylindrical linear actuating device surrounding said linear element and movable reciprocally along the axis of the linear element between stationary abutments, a stationary cylindrical gripping member surrounding the linear element and spaced from said actuating device along the axis of the linear element, said stationary gripping member forming one of said abutments, means for effecting frictional engagement between the linear element and the inner periphery of said actuating device, means for effecting frictional engagement between the linear element and the inner periphery of the stationary gripping member, electromagnetic coil means adapted when energized to urge said actuating device into engagement with said one abutment, and resilient means positioned adjacent that end of said actuating device remote from said one abutment for moving the actuating device into engagement with the other of the abutments independently of any magnetic actuating device.

2. In a linear motion device of the type having a linear element comprising a bundle of parallel rods of magnetically permeable material which can be expanded radially outwardly under the influence of an external magnet field, the combination of a cylindrical linear actuating device of magnetically permeable material surrounding the linear element and movable along the axis of the linear element between stationary abutments, a stationary cylindrical gripping member of magnetically permeable material surrounding said linear element and axially spaced from the actuating device to form one of said abutments, resilient means positioned adjacent said other abutment for urging said actuating device into engagement with said other abutments, first electromagnetic coil means surrounding said stationary gripping member for expanding said rods to hold the linear element in frictional engagement with the stationary gripping member, second electromagnetic coil means surrounding the actuating device for expanding said rods to hold the linear element in frictional engagement with the actuating device, and third electromagnetic coil means reacting between said actuating device and the adjacent portion of said stationary gripper member for moving said actuating device into engagement with said one abutment against the force of said resilient means.

3. In a linear motion device of the type having a linear element comprising an elongated bundle of parallel rods of magnetically permeable material which can be expanded radially outwardly under the influenece of an external magnetic field, the combination of a cylindrical actuating device of magnetically permeable material surrounding the linear element and movable along the axis of the linear element between stationary abutments, a stationary cylindrical gripping member of magnetically permeable material surrounding said linear element and having one end thereof axially spaced from one end of the actuating device, spring means positioned adjacent the other end of said actuating device urging said actuating device into engagement with one of said abutments, said one end of said stationary gripping member forming the other of said abutments first electromagnetic coil means surrounding said stationary gripping member for expanding said rods to hold the linear element in frictional engagement with the stationary gripping member, second electromagnetic coil means surrounding the actuating device for expanding said rods to hold the linear element in frictional engagement with the actuating device, third electromagnetic coil means positioned between said first and second coil means in alignment with said one end of said stationary gripping member and said one end of said actuating device for moving said actuating device into engagement with the other of said abutments against the force of said spring means, circuit means for intermittently energizing said second and third coil means while the first coil means is deenergized, and circuit means for energizing the first coil means while the second and third coil means are deenergized.

4. In a linear motion device of the type having a linear element comprising a bundle of parallel rods of magnetically permeable material which can be expanded radially outwardly under the influence of an external magnetic field, the combination of a cylindrical linear actuating device of magnetically permeable material surrounding the linear element and movable along the axis of the element, a cylindrical housing of magnetically permeable material surrounding said actuating device and the linear element, a cylindrical member secured within said housing at one end thereof and having a radially-inwardly extending flange on the end thereof which extends furthest into the cylindrical cavity, a cylindrical extension on said linear actuating device extending into the cylindrical cavity formed by said member, a radially-outwardly extending flange on said extension on the end thereof which extends into said cylindrical cavity, a coil spring interposed between said flanges for urging the actuating device into abutment with said member, a second cylindrical member at the other end of said cavity, first electromagnetic coil means surrounding said second cylindrical member for expanding said rods to hold the linear element in frictional engagement with the second member, second electromagnetic coil means surrounding the actuating device for expanding said rods to hold the linear element in frictional engagement with the actuating device, and third electromagnetic coil means for moving said actuating device into engagement with said second member against the force of said coil spring.

5. The linear motion device of claim 3 wherein said one abutment comprises an annular projection surrounding said linear element, said actuating device including a projection formed at the other end thereof and passing through the opening in said annular projection and including an outward flange adjacent the end thereof mounted in opposed relationship with said annular projection and said spring means being mounted in compression between said annular projection and said flange.

References Cited

UNITED STATES PATENTS 2,803,761   8/1957   Young _____ 310—14

FOREIGN PATENTS 155,217   12/1963   U.S.S.R.

J D MILLER, *Primary Examiner.*

D. F. DUGGAN, *Assistant Examiner.*

U.S. Cl. X.R.

318—135